US 7,326,751 B2

(12) United States Patent
DeLucia et al.

(10) Patent No.: US 7,326,751 B2
(45) Date of Patent: Feb. 5, 2008

(54) METHOD OF THERMALLY PROCESSING ELASTOMERIC COMPOSITIONS AND ELASTOMERIC COMPOSITIONS WITH IMPROVED PROCESSABILITY

(75) Inventors: Mary Lucille DeLucia, Roswell, GA (US); Christian Lee Sanders, Decatur, GA (US); Tamara Lee Mace, Doraville, GA (US); Silverio Donato de la Cruz, Jr., Cumming, GA (US); Jessica King Bersted, LaGrange, GA (US)

(73) Assignee: Kimberly-Clark Worlwide, Inc., Neenah, WI (US)

( * ) Notice: Subject to any disclaimer, the term of this patent is extended or adjusted under 35 U.S.C. 154(b) by 0 days.

(21) Appl. No.: 10/724,654

(22) Filed: Dec. 1, 2003

(65) Prior Publication Data

US 2005/0119410 A1 Jun. 2, 2005

(51) Int. Cl.
*C08L 53/00* (2006.01)
(52) U.S. Cl. .................. 525/95; 525/479; 524/413; 264/211
(58) Field of Classification Search .............. 525/479, 525/95; 524/413; 264/211
See application file for complete search history.

(56) References Cited

U.S. PATENT DOCUMENTS

| 3,276,944 | A | 10/1966 | Levy |
| 3,338,992 | A | 8/1967 | Kinney |
| 3,341,394 | A | 9/1967 | Kinney |
| 3,502,538 | A | 3/1970 | Petersen |
| 3,502,763 | A | 3/1970 | Hartmann |
| 3,542,615 | A | 11/1970 | Dobo et al. |
| 3,676,242 | A | 7/1972 | Prentice |
| 3,692,618 | A | 9/1972 | Dorschner et al. |
| 3,802,817 | A | 4/1974 | Matsuki et al. |
| 3,849,241 | A | 11/1974 | Butin et al. |
| 3,855,046 | A | 12/1974 | Hansen et al. |
| 3,907,743 | A | 9/1975 | Goto et al. |
| 3,942,937 | A | 3/1976 | Prober et al. |
| 3,961,122 | A | 6/1976 | Gaines, Jr. et al. |
| 4,041,203 | A | 8/1977 | Brock et al. |
| 4,142,031 | A | 2/1979 | Kato et al. |
| 4,209,563 | A | 6/1980 | Sisson |
| 4,293,608 | A | 10/1981 | Isaka et al. |
| 4,340,563 | A | 7/1982 | Appel et al. |
| 4,374,888 | A | 2/1983 | Bornslaeger |
| 4,443,513 | A | 4/1984 | Meitner et al. |
| 4,494,629 | A | 1/1985 | Raeburn |
| 4,522,203 | A | 6/1985 | Mays |
| 4,535,113 | A | 8/1985 | Foster et al. |
| 4,613,640 | A | 9/1986 | Deisler et al. |
| 4,659,612 | A | 4/1987 | Balloni et al. |
| 4,663,220 | A | 5/1987 | Wisneski et al. |
| 4,720,415 | A | 1/1988 | VanderWielen et al. |
| 4,734,324 | A | 3/1988 | Hill |
| 4,739,001 | A * | 4/1988 | Okamoto et al. ........... 524/264 |
| 4,741,949 | A | 5/1988 | Morman et al. |
| 4,769,418 | A | 9/1988 | Mizuno et al. |
| 4,787,991 | A | 11/1988 | Morozumi et al. |
| 4,789,699 | A | 12/1988 | Kieffer et al. |
| 4,795,668 | A | 1/1989 | Krueger et al. |
| 4,857,593 | A | 8/1989 | Leung et al. |
| 4,859,759 | A | 8/1989 | Maycock et al. |
| 4,863,983 | A | 9/1989 | Johnson et al. |
| 4,920,168 | A | 4/1990 | Nohr et al. |
| 4,923,914 | A | 5/1990 | Nohr et al. |
| 4,925,890 | A | 5/1990 | Leung et al. |
| 4,931,492 | A | 6/1990 | Foster et al. |
| 4,957,648 | A | 9/1990 | Yodice et al. |
| 4,976,788 | A | 12/1990 | Nohr et al. |
| 4,983,447 | A | 1/1991 | Crass et al. |
| 5,003,023 | A | 3/1991 | Foster et al. |
| 5,008,056 | A | 4/1991 | Kurtz et al. |
| 5,057,262 | A | 10/1991 | Nohr et al. |
| 5,064,802 | A | 11/1991 | Stevens et al. |
| 5,104,728 | A | 4/1992 | Obermeyer et al. |
| 5,108,820 | A | 4/1992 | Kaneko et al. |
| 5,116,662 | A | 5/1992 | Morman |
| 5,120,888 | A | 6/1992 | Nohr et al. |
| 5,139,875 | A * | 8/1992 | Metzemacher et al. ..... 428/403 |
| 5,178,931 | A | 1/1993 | Perkins et al. |
| 5,188,885 | A | 2/1993 | Timmons et al. |
| 5,271,883 | A | 12/1993 | Timmons et al. |
| 5,288,791 | A | 2/1994 | Collier, IV et al. |
| 5,332,613 | A | 7/1994 | Taylor et al. |
| 5,336,552 | A | 8/1994 | Strack et al. |
| 5,336,707 | A | 8/1994 | Nohr et al. |
| 5,356,585 | A | 10/1994 | Romenesko |
| 5,374,696 | A | 12/1994 | Rosen et al. |
| 5,382,400 | A | 1/1995 | Pike et al. |
| 5,403,891 | A | 4/1995 | Romenesko |
| 5,413,655 | A | 5/1995 | Nohr et al. |
| 5,451,450 | A | 9/1995 | Erderly et al. |
| 5,472,775 | A | 12/1995 | Obijeski et al. |

(Continued)

FOREIGN PATENT DOCUMENTS

CA 803714 1/1969

(Continued)

OTHER PUBLICATIONS

"Olefin Polymers", *Encyclopedia of Chemical Technology*, Kirk-Othmer, Fourth Edition, vol. 17, John Wiley & Sons, 1996, pp. 764-767.

(Continued)

*Primary Examiner*—Kuo-Liang Peng
(74) *Attorney, Agent, or Firm*—Dority & Manning, P.A.

(57) ABSTRACT

The present invention provides an improved elastomeric composition that includes from about 0.01 to about 0.5 weight percent of a polyorganosiloxane or a combination of polyorganosiloxanes.

28 Claims, 3 Drawing Sheets

U.S. PATENT DOCUMENTS

| | | | |
|---|---|---|---|
| 5,473,002 | A | 12/1995 | Gardiner et al. |
| 5,494,855 | A | 2/1996 | Nohr et al. |
| 5,539,124 | A | 7/1996 | Etherton et al. |
| 5,540,976 | A | 7/1996 | Shawver et al. |
| 5,540,992 | A | 7/1996 | Marcher et al. |
| 5,554,775 | A | 9/1996 | Krishnamurti et al. |
| 5,599,420 | A | 2/1997 | Yeo et al. |
| 5,665,803 | A | 9/1997 | Nohr et al. |
| 5,708,084 | A | 1/1998 | Hauenstein et al. |
| 5,708,085 | A | 1/1998 | Hauenstein et al. |
| 5,759,926 | A | 6/1998 | Pike et al. |
| 5,789,473 | A | 8/1998 | Hauenstein et al. |
| 5,800,758 | A | 9/1998 | Topolkaraev et al. |
| 5,866,246 | A | 2/1999 | Schreck et al. |
| 5,891,555 | A | 4/1999 | O'Brien |
| 5,902,854 | A | 5/1999 | Kelley et al. |
| 6,013,217 | A | 1/2000 | Hauenstein et al. |
| 6,075,179 | A | 6/2000 | McCormack et al. |
| 6,087,015 | A | 7/2000 | Cretekos et al. |
| 6,121,354 | A | 9/2000 | Chronister |
| 6,146,757 | A | 11/2000 | Mor et al. |
| RE37,036 | E | 1/2001 | Groves |
| 6,245,271 | B1 | 6/2001 | Jacobs et al. |
| 6,288,144 | B1 | 9/2001 | Roberts et al. |
| 6,300,415 | B1 | 10/2001 | Okayama et al. |
| 6,309,736 | B1 | 10/2001 | McCormack et al. |
| 6,322,894 | B1 | 11/2001 | Harley et al. |
| 6,348,258 | B1 | 2/2002 | Topolkaraev et al. |
| 6,353,149 | B1 | 3/2002 | Stone |
| 6,355,127 | B1 | 3/2002 | Mahdi et al. |
| 6,355,317 | B1 | 3/2002 | Reid et al. |
| 6,455,150 | B1 | 9/2002 | Sheppard et al. |
| 6,479,154 | B1 | 11/2002 | Walton et al. |
| 6,576,329 | B2 | 6/2003 | Kong |
| 6,824,878 | B2 | 11/2004 | Migliorini et al. |
| 7,067,592 | B2 * | 6/2006 | Chino et al. ............. 525/327.6 |
| 2002/0104608 | A1 | 8/2002 | Welch et al. |
| 2003/0187137 | A1 | 10/2003 | Handlin, Jr. et al. |
| 2004/0116571 | A1 * | 6/2004 | Su et al. ..................... 524/404 |

FOREIGN PATENT DOCUMENTS

| | | |
|---|---|---|
| EP | 0071349 B1 | 10/1986 |
| EP | 0338393 | 10/1989 |
| EP | 0722981 | 7/1996 |
| WO | WO 98/010724 | 3/1998 |
| WO | WO 98/23804 | 6/1998 |
| WO | WO 98/025998 | 6/1998 |
| WO | WO 99/14045 | 3/1999 |
| WO | WO 99/55755 | 11/1999 |
| WO | WO 01/88245 | 11/2001 |
| WO | WO 02/053352 | 7/2002 |
| WO | WO 02/081206 | 10/2002 |
| WO | WO 02/096180 | 12/2002 |
| WO | WO 03/035779 | 5/2003 |
| WO | WO 03/048065 | 6/2003 |
| WO | WO 03/048238 | 6/2003 |

OTHER PUBLICATIONS

Wente, V.A. et al., NRL Report 4346, "Manufacture of Super-Fine Organic Fibers", May 1954.

Lawrence, K.D. et al., NRL Report 5265, "An Improved Device for the Formulation of Superfine Thermoplastic Fibers", Feb. 1959.

Derwent Publications Ltd., Abstract for JP 62 060501A, Mar. 17, 1987, Dainippon Ink & Chem KK.

Derwent Publications Ltd., Abstract for JP 05 098117A, Apr. 20, 1993, Asahi Chem Ind Co Ltd.

"LLDPE Processed on LDPE Equipment", *Modern Plastics International*, Jul. 1986, p. 46.

Hauenstein, D. E. et al., "Evaluation of Process Aids for Controlling Surface Roughness of Extruded LLDPE," *Imaging and Image Analysis Applications for Plastics*, 1999, pp. 97-105.

Flick, E.W., *Plastics Additives—An Industrial Guide*, 2nd Ed., 1993, pp. 661-674.

U.S. Appl. No. 11/585,044, filed Oct. 23, 2006, DeLucia et al.

* cited by examiner

METHOD OF THERMALLY PROCESSING ELASTOMERIC COMPOSITIONS AND ELASTOMERIC COMPOSITIONS WITH IMPROVED PROCESSABILITY

FIELD OF THE INVENTION

This invention relates to elastomeric compositions and methods of improving the thermal processing of elastomeric compositions.

BACKGROUND OF THE INVENTION

Many products today require highly engineered elastic components and yet, at the same time, must be produced at a cost consistent with limited use or disposability. By limited use or disposable, it is meant that the product and/or component is used only a small number of times or possibly only once before being discarded. Examples of such products include, but are not limited to, personal care absorbent products such as diapers, training pants, incontinence garments, and so forth. These products can and do utilize as components, elastic films, elastic fabrics, elastic filaments and/or elastic laminates.

Production of elastomeric filaments, elastic films, elastic nonwovens and elastic laminates has been accompanied by persistent problems of buildup of the composition being extruded on the die tip causing machine downtime for cleanup, frequently after only a few hours of operation. Various mechanisms are known to facilitate the cleaning and maintenance of dies used for the extrusion of polymer materials, while minimizing downtime. Molten polymers are extruded through dies to form films, strands, nonwoven webs, and other finished polymer forms. Particularly with elastic polymer compositions containing elastomers, as polymer exits the die, some of the polymer composition clings to the die openings or "lips," accumulating on the exterior surface of the die. Die lip build-up gradually increases until it accumulates to a point where it breaks off, possibly causing a defect in the product, which can be, for example, in the form of thin spots or tears or otherwise deleterious effects on the texture or other esthetic properties of the product as well as other defects that are the result of stoppage. Considerable engineering goes into the design of dies and selection of extrusion compositions to minimize this build-up. Diverging, converging, radiused, and angled die lip geometries all are examples of methods developed to minimize this build-up. However, no die design completely eliminates it. It is common practice to temporarily halt the extrusion operation to perform maintenance on the die to remove this build-up. Stoppages adversely affect production yields, increase costs and may also adversely affect product uniformity. Accordingly, it is advantageous to minimize work stoppages.

Methods of reducing die lip build up or accumulation of extrudate contamination during extrusion have been attempted. For example, U.S. Pat. No. 6,245,271 describes a method of reducing die lip build up during extrusion that utilize a die having die lips with a radius of curvature of from about 0.5 mils to about 3 mils. It would be advantageous to develop a method for reducing die lip build up during extrusion. Particularly, it would also be advantageous to develop a method of reducing die lip build up during extrusion of elastomeric compositions that does not require modification of existing equipment.

Additionally, commercial processes commonly make multiple products at ranges of filament basis weights on the same die thus creating a need for a broad process window for manufacturing. For example, a 9 gram per square meter (gsm) filament sheet can be extruded at a specific throughput from a die. In order to increase the filament weight, a higher throughput is needed in the same die. The increase in throughput creates an increase in the shear rates and can create flow instabilities at the die exit. This phenomenon is commonly seen with melt fracture or shark skinning on the surface of an extruded filament. It would also be advantageous to increase the throughput range of a process without investing in multiple dies.

SUMMARY OF THE INVENTION

The present invention provides methods of thermally processing elastomeric compositions and elastomeric compositions with improved processability. Generally, the present invention provides elastomeric compositions that include a polyorganosiloxane as a processing aid. A suggested polyorganosiloxane is SILQUEST® PA-1 silicone additive. For example, the present invention provides elastomeric compositions that include an elastomeric block copolymer and from about 0.01 to about 0.5 weight percent of a polyorganosiloxane or a combination of polyorganosiloxanes. More desirably, the elastomeric composition includes from about 0.01 to about 0.2 weight percent of a polyorganosiloxane or a combination of polyorganosiloxanes. Still more desirably, the elastomeric composition includes from about 0.01 to about 0.1 weight percent of a polyorganosiloxane or a combination of polyorganosiloxanes. And still more desirably, the elastomeric composition includes from about 0.02 to about 0.08 weight percent of a polyorganosiloxane or a combination of polyorganosiloxanes. The elastomeric block copolymer may be, but is not limited to, a styrenic block copolymer, for example a styrene/ethylene-propylene/styrene/ethylene-propylene tetrablock copolymer or a styrene/ethylene-butylene/styrene/ethylene-butylene tetrablock copolymer. Commercial examples of such copolymers include various KRATON™ styrenic block copolymers. The elastomeric block copolymer may include a block copolymer having styrenic moiety blocks and polymer mid-blocks. The elastomer may also be a thermoplastic polyurethane or any other elastic block copolymer. Desirably, the elastomeric compositions of the present invention are melt extrudable thermoplastic composition and the addition of the polyorganosiloxane lowers the extrusion temperature of the composition relative to the melt extrusion temperature of the elastomeric block copolymer without the polyorganosiloxane.

Exemplary polyorganosiloxanes include polyorganosiloxanes of the following formula:

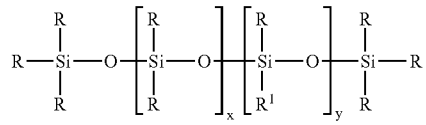

wherein R is an alkyl radical and $R^1$ is a monovalent organic radical containing at least one ethylene oxide group, vicinal epoxy group or amino group and x and y are independently selected from the group of positive integers. Compositions of the present invention may further include a titanate or a zirconate or a mixture thereof. Suggested concentrations range from about 0.01 to about 3 weight percent of a titanate, a zirconate or a combination thereof. Suggested titanates include Ken-React® LICA® 01, Ken-React® CAPOW®, and Ken-React® CAPS supplied by Kenrich Petrochemicals, Inc. of Bayonne, N.J.

The present invention also provides a process for reducing the extrusion temperature of an elastomeric block copolymer and the process includes adding a polyorganosiloxane or a mixture of polyorganosiloxanes to the elastomeric block copolymer. From about 100 to about 1000 parts by weight of polyorganosiloxane or a mixture of polyorganosiloxanes can added to the elastomeric block copolymer per 1,000,000 parts of elastomeric block copolymer. The present invention also provides films, fibers and nonwoven fabrics that include an elastomeric block copolymer and from about 0.01 weight percent to about 0.2 weight percent of a polyorganosiloxane or a mixture of polyorganosiloxane relative to the weight of the elastomeric block copolymer.

The inclusion of a polyorganosiloxane in the elastomeric composition improves the thermal processability of the elastomeric composition and increases the processing window by facilitating thermal processing under a broader range of extrusion operating temperatures, shear rates and/or operating pressures. For example, this broadening of the process window means good quality filaments can be extruded at a larger range of throughputs and correspondingly larger pressure ranges. In certain embodiments, methods and compositions of the present invention reduce die lip build up, die fouling and spinneret fouling during the extrusion of strands, films, and fibers, respectively. Faster processing is commonly limited by draw resonance. This phenomenon develops as process speed increases and necking is created by the inability of the composition to respond to the line speed. The addition of the polyorganosiloxane decreases draw resonance and increase the rate at which the composition can emerge from the die. The inclusion of the polyorganosiloxane may also have the additional benefit of extend die life and pack life of the apparatus used to extrude the elastomeric compositions.

DEFINITIONS

The term "continuous filaments", as used herein, refers to strands of continuously formed polymeric filaments. Such filaments will typically be formed by extruding molten material through a die head having a certain type and arrangement of capillary holes therein.

The term "elastic" or "elasticized", as used herein, refers to a material which, upon application of a biasing force, is stretchable, which is elongatable to at least about 60 percent (i.e., to a stretched, biased length which is at least about 160 percent of its relaxed unbiased length), and which will recover at least 55 percent of its elongation upon release of the stretching force. A hypothetical example of an elastic material would be a one (1) inch sample of a material which is elongatable to at least 1.60 inches and which, when released, will recover to a length of not more than 1.27 inches. Many elastic materials may be elongated by more than 60 percent (i.e., more than 160 percent of their relaxed length). For example, some elastic material may be elongated 100 percent or more, and many of these will recover to substantially their initial relaxed length such as, for example, within 105 percent of their original relaxed length upon release of the stretching force.

As used herein, the term "polymer" generally includes, but is not limited to, homopolymers, copolymers, such as, for example, block, graft, random and alternating copolymers, terpolymers, etc. and blends and modifications thereof. Furthermore, the term "polymer" includes all possible geometrical configurations of the material, such as isotactic, syndiotactic and random symmetries.

The term "composite nonwoven fabric", "composite nonwoven", "laminate", or "nonwoven laminate", as used herein, unless otherwise defined, refers to a material having at least one elastic material joined to at least one sheet material. In most embodiments such laminates or composite fabric will have a gatherable layer which is bonded to an elastic layer or material so that the gatherable layer may be gathered between bonding locations. As set forth herein, the composite elastic laminate may be stretched to the extent that the gatherable material gathered between the bond locations allows the elastic material to elongate. This type of composite elastic laminate is disclosed, for example, in U.S. Pat. No. 4,720,415 to Vander Wielen et al., which is incorporated herein in its entirety by reference thereto.

As used herein, the term "nonwoven web" refers to a web having a structure of individual fibers or threads that are interlaid, but not in an identifiable, repeating manner. Nonwoven webs have been, in the past, formed by a variety of processes such as, for example, meltblowing processes, spunbonding processes and bonded carded web processes.

As used herein, the term "meltblown fibers" means fibers formed by extruding a molten thermoplastic material through a plurality of fine, usually circular, die capillaries as molten thermoplastic material or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, U.S. Pat. No. 3,849,241 to Butin, which is incorporated herein in its entirety by reference thereto.

As used herein, the term "spunbonded fibers" refers to small diameter fibers formed by extruding a molten thermoplastic material as filaments from a plurality of fine, usually circular, capillaries of a spinerette with the diameter of the extruded filaments then being rapidly reduced as by, for example, eductive stretching or other well-known spunbonding mechanisms. The production of spun-bonded nonwoven webs is illustrated in patents such as, for example, U.S. Pat. No. 4,340,563 to Appel et al., and U.S. Pat. No. 3,692,618 to Dorschner et al. The disclosures of these patents are incorporated herein in their entireties by reference thereto.

DETAILED DESCRIPTION OF THE INVENTION

Figure 1:
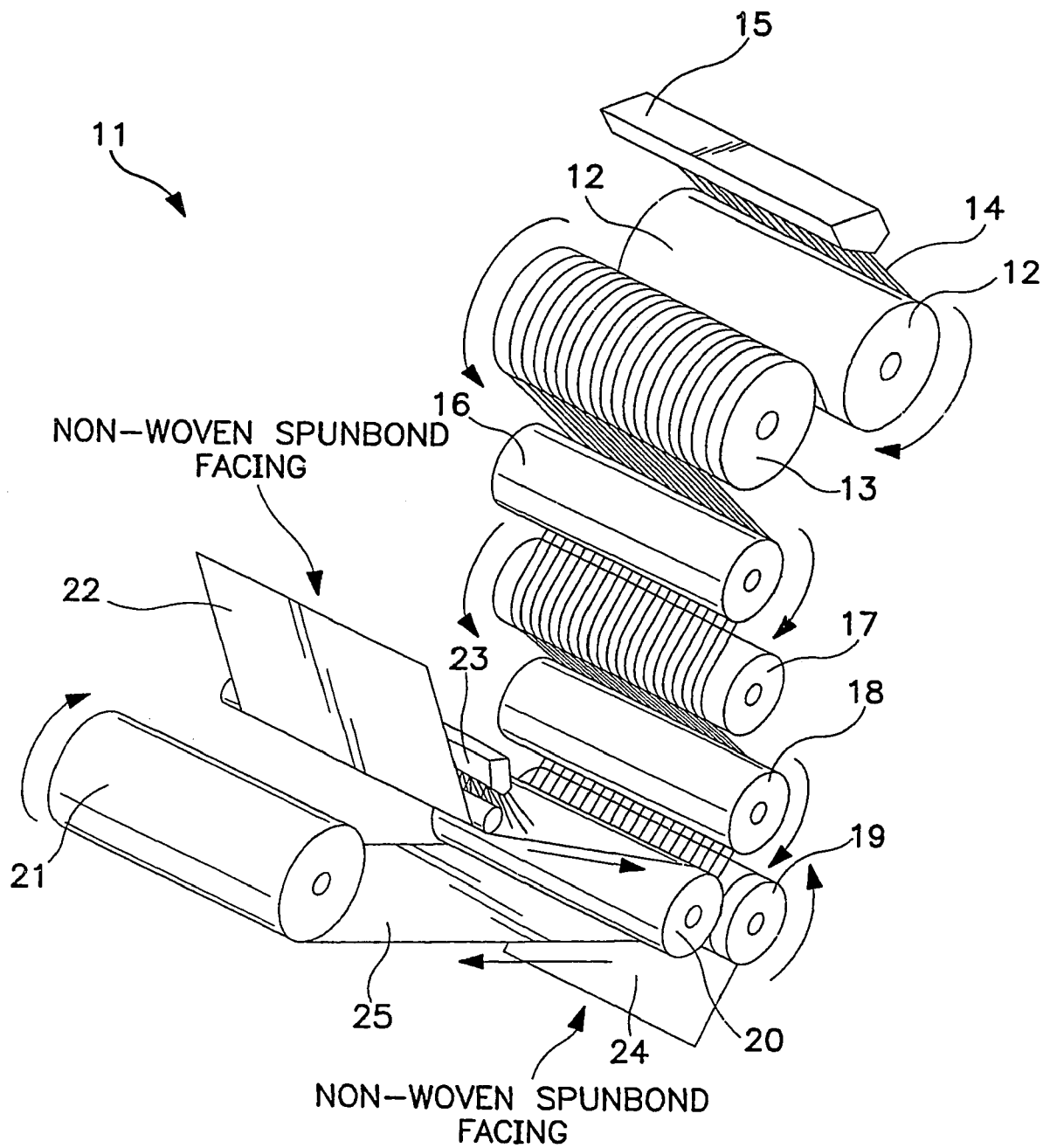
FIG. 1 is a perspective view of a vertical filament laminating (VFL) system.

Reference now will be made to embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions.

Generally, the present invention provides elastomeric compositions with improved processability and methods of improving the thermal processing of elastomeric compositions. It has been discovered that the addition of a polyorganosiloxane to an elastomeric composition improves the processability of the elastomeric composition, for example, by reducing or eliminating die-lip fouling and wraps caused by drool from the die, lowering melt processing temperature, and/or increasing the processing window of a specific composition and process, thus, increasing the process window by allowing for faster processing greatly reduces costs. Faster processing is commonly limited by draw resonance. This phenomenon develops as process speed increases and necking is created by the inability of the composition to respond to the line speed. These improvements can result in reduced down time and waste, lowered production costs, and increased yields.

The elastomeric compositions of the present invention include an elastomer and a polyorganosiloxane or a mixture of polyorganosiloxanes with or without the inclusion of optional titanates and/or zirconates. Desirably, the elastomeric compositions of the present invention include greater than 50 weight percent of an elastomer or a combination of elastomers, more desirably greater than 75 weight percent and even more desirably greater than 80 weight percent. Suggested commercially available elastomers include, but are not limited to, various KRATON™ resins. One particular class of polymers that may be utilized in the present process is the KRATON™ G series of polymers distributed by KRATON™ Polymers, LLC of Houston, Tex. Various other KRATON™ polymers may be utilized. Suggested KRATON™ polymers include KRATON™ G2838 and KRATON™ MD6665 polymers. KRATON™ polymers are thermally processable elastomeric copolymers having desirable elastomeric properties and are styrenic block copolymers for example styrene-ethylene/propylene-styrene block copolymers, a styrene-/ethylene/-propylene-/styrene-/ethylene/-propylene block copolymers, a styrene-/ethylene/-butylene-/styrene-/ethylene/-butylene block copolymers, a styrene-/ethylene/-butylene-/styrene block copolymers or a styrene-/ethylene/-propylene-/styrene block copolymers. Examples of such thermoplastic styrenic block copolymers are described in U.S. Patent Application Publication no. 2003/0187137. A broad range of multiblock copolymers can be used in this composition including, but not limited to, thermoplastic elastomers including polystyrene elastomer block copolymers such as the above listed KRATON™ polymers, polyurethane elastomer block copolymers such as ESTANE and ROYLAR polymers, polyether elastomer block copolymers such as HYTREL polymers, and polyamide elastomer block copolymers such as MONTAC polymers.

The elastomeric composition of the present invention include from about 0.01 weight percent to about 0.5 weight percent of a polyorganosiloxane or mixture of polyorganosiloxanes, more desirably from about 0.01 to about 0.1 weight percent. Suggested polyorganosiloxanes include, but are not limited to, polyorganosiloxanes of the following formula:

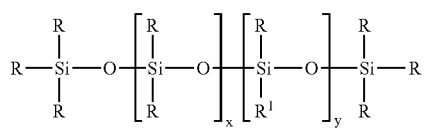

wherein R is an alkyl radical and $R^1$ is a monovalent organic radical containing at least one ethylene oxide group, vicinal epoxy group or amino group and x and y are independently selected from the group of positive integers. Such polyorganosiloxanes are described in U.S. Pat. No. 4,535,113. Other suggested polyorganosiloxanes are described in U.S. Pat. Nos. 4,857,593; 4,925,890; 4,931,492; and 5,003,023. A suggested commercially available example of such a polyorganosiloxane is SILQUEST® PA-1 polyorganosiloxane. Suggested concentrations of polyorganosiloxane additive in the elastomeric composition range from about 0.01 weight percent to 0.5 weight percent, more desirably from about 0.01 to about 0.2 weight, even more desirably from about 0.01 to about 0.1 weight percent and even more desirably from about 0.02 to about 0.08 and even from about 0.025 to about 0.075 weight percent of polyorganosiloxane additive. It is believed that the polyorganosiloxane additive coats the metal surfaces of the melt processing equipment and enable melted polymer compositions to process against a more beneficial polyorganosiloxane coated surface compared to the metal surface of the processing equipment. It is suggested that the polyorganosiloxane is initially set at about 0.1 weight percent to condition the equipment and then lowered to the desired range, for example to about 0.05 or about 0.0050 weight percent, to support continual coating of the extrusion surfaces without excess polyorganosiloxane additive in the elastomeric resin, thus minimizing effects of the polyorganosiloxane additive on the mechanical properties of the final product.

In addition, the elastomeric composition may further include titanates or zirconates to improve any loss in tack that is observed with the addition of polyorganosiloxane additive. Suggested titanates include, but are not limited to, Ken-React® LICA® 01, React® LICA® 12, Ken-React® CAPOW®, Ken-React® CAPS® supplied by Kenrich Petrochemicals, Inc., of Bayonne, N.J. Suggested zirconates include, but are not limited to, Ken-React® CAPS NZ 01/L supplied by Kenrich Petrochemicals, Inc. Ken-React® LICA® 01 is titanium IV tetrakis 2,2(bis2-propenolatomethyl)butanolato tris neodecanoato-O. Ken-React® LICA® 12 is titanium IV tetrakis 2,2(bis2-propenolatomethyl)butanolato, tris(dioctyl)phosphato-O. Ken-React® LZ 01 is zirconium IV tetrakis 2,2(bis2-propenolatomethyl)butanolato, tris neodecanoato-O. Ken-React® LZ 12 is zirconium IV tetrakis 2,2(bis2-propenolatomethyl)butanolato, tris(dioctyl)phosphato-O. Suggested amounts of titanates and/or zirconates that can be optionally included in the compositions and methods of the present invention are from about 0.0.1 to about 3 weight percent of one or more titanates, zirconates or a combination thereof, more desirably from about 0.01 to about 0.3 weight percent of a titanate, a zirconate or a combination thereof.

The present invention will now be described with reference to a method of making vertical filament laminates that includes elastomeric filaments extruded from an elastomeric composition of the present invention. The described vertical filament laminating system is described in detail in U.S. patent application Publication No. 2002/0104608 and PCT International Publication No. WO 01/88245 both of which are hereby incorporated by reference herein. The method produces stretchable laminate articles that can be utilized in a variety of applications such as side panels in training pants and other products requiring a certain degree of elasticity. The described vertical filament laminator system produces a stretchable laminate by use of a vertically oriented process. Specifically, the described process employs an extruder for supplying a number of strands of elastic continuous filaments to form the stretchable component from an elastomeric composition of the present invention. The actual number of continuous filaments utilized in forming the composite fabric may be varied depending on the particular characteristics desired in the final product. For example, as many as 215 separate strands, in many cases more than 100 strands, per width of material and up to as many as 2600 strands total, or more may be utilized.

The die of the extruder may be positioned with respect to the first roller so that the continuous filaments meet this first roller at a predetermined angle. This strand extrusion geometry is advantageous for depositing a melt extrudate onto a rotating roll or drum. An angled, or canted, orientation provides an opportunity for the filaments to emerge from the die at an angle to the roll tangent point resulting in improved spinning, more efficient energy transfer, and generally longer die life. This configuration allows the filaments to emerge from the die and follow a relatively straight,path to contact the tangent point on the roll surface. The angle between the die exit of the extruder and the vertical axis (or the horizontal axis of the first roller, depending on which angle is measured) may be as little as a few degrees or as much as 90°. For example, a 90° extrudate exit to roller angle could be achieved by positioning the extruder directly above the downstream edge of the first roller and having a side exit die tip on the extruder. Moreover, angles such as about 20°, about 35°, or about 45° away from vertical may be utilized. It has been found that, when utilizing a 12-filament/inch spinplate hole density as explained below, an approximately 45° angle allows the system to operate effectively. The optimum angle, however, will vary as a function of extrudate exit velocity, roller speed, vertical distance from the die to the roller, and horizontal distance from the die centerline to the top dead center of the roller. Optimal performance can be achieved by employing various geometries to result in improved spinning efficiency and reduced filament breakage. In many cases, this results in potentially increased roll wrap resulting in more efficient energy transfer and longer die life due to reduced drag and shear of the extrudate as it leaves the capillaries of the extruder die and proceeds to the chilled roll. Generally, elastomeric compositions of the present invention that include the one of the above described silicone additives have improved spinning efficiency, reduced filament breakage, reduced drag and shear of the extrudate than the same elastomeric composition that does not include such a silicone additive.

The rollers that carry the continuous filaments are positioned and operated so as to cause the continuous filaments to be stretched as they vertically flow through the lamination system. When a number of rollers are employed, each successive roller turns in a direction opposite to the immediately preceding roller so that the strands of continuous filaments are handed off from roller to roller. In addition, the speed of each successive roller may be varied from the preceding roller so as to obtain the desired stretching and elongation characteristics. For example, any particular roller may operate at between 1 to 10 times, and more, the speed of any preceding roller. Typically, a separate controller, such as a servomotor or a Turner drive, may be utilized to allow individual speed control for each roll and will drive each individual roll. When the speed is varied, successive rollers may turn at a faster rate to stretch or elongate the strands as they move downwardly in the vertical process. In addition, the continuous filaments are ultimately reduced to a fiber size of approximately 0.008 to 0.040 inches in diameter, and in some cases to approximately 0.015 to 0.020 inches in diameter.

The number of separate rollers used to convey the continuous filaments to the bonding location may vary depending on the particular attributes desired in the final product. For example, at least four rollers—a first chilled(or positioning) roller, a second chilled roller, a third unchilled roller, and a fourth unchilled roller—may be utilized. Alternatively, only two chilled rollers may be needed before the continuous filaments are supplied to the laminator portion of the system which bonds the spunbond facing(s) to the continuous filaments in a roller nip.

The rollers may be plasma coated to provide good release properties. Additionally, the rollers may additionally be grooved or channeled to ensure that the extruded continuous filaments maintain a proper separation between individual filaments as the filaments pass over the surface of the rolls and flow through the system. Smooth rolls may be used for one or all of the rolls. In the case where plasma-coated rolls are employed, the continuous filaments will not slip as much as they do on smooth, uncoated rolls. The plasma-coating grips the strands and promote increased uniformity of distances between the continuous filament strands.

Various mechanisms may be utilized to quench the continuous filaments. For example, external air could be forced onto the fibers in order to control the hardening of the fibers. Alternatively, one large roll could be used with sufficient surface area in order to quench the fibers.

After passing through the series of rollers and becoming stretched, the continuous filaments are then conveyed into a position so that a sheet material may be bonded to the continuous filaments at a laminator section. This sheet material will be less elastic than the continuous filaments. The sheet material may be various meltblown nonwoven webs, spunbond nonwoven webs, carded webs, or even woven webs. Certain enhanced properties and production efficiencies, however, arise from the use of polymeric spunbond nonwoven webs. In one particular embodiment, a polypropylene spunbond facing having a basis weight of approximately 0.4 ounces per square yard ("osy") may be employed.

Bonding may be achieved either autogenously or through the use of a separate adhesive or as a combination of autogenous and adhesive bonding. Typically, the process will have sufficiently quenched the continuous filaments by the time they arrive at the bonding station so that autogenous (or bonding without adhesive) alone would not be possible. Typically, an adhesive, such as a melt-spray type adhesive, is employed. Although, as explained below, if sufficient tackifying resins, or other adhesive components, are utilized either in the facings or in the continuous filaments, then autogenous bonding might be possible.

The adhesive can be sprayed directly onto the sheet material to be bonded to the continuous filaments. However, other arrangements of adhesive application, such as brushing or the like, may also be utilized. In addition, the adhesive may be applied directly to the sheet material prior to bonding with the continuous filaments, may be applied to both the continuous filaments and the sheet material prior to bonding, or may be applied to one or both of the filaments and the sheet material while bonding pressure is being applied. The present invention is not limited to any particular bonding mechanism.

Particular meltspray adhesives that may be utilized include Findley-brand H2525A and Findley-brand H2096, both available from Findley Adhesives (known also as Bostik Findley). These adhesives may be applied through a hot melt spray die at an elevated temperature of approximately 300-375° F. to the inner surface of the facing. The meltspray adhesive usually will form a very lightweight layer of about 3 grams per square meter ("gsm") of adhesive in the final composite. These particular Findley adhesives are elastic as well.

The system employs nip rolls to apply pressure to the adhesive-coating facing and the continuous filaments to result in the necessary lamination. The outer facing is bonded together with the continuous filaments at a fairly high surface pressure, which may be between about 20 and 300 pounds per linear inch ("pli"). A typical bonding pressure may be about 50 pli or about 100 pli.

The bonder, or nip roll, (sometimes referred to as "laminator") section of the laminating apparatus performs the primary stretching on the continuous filaments. The speed ratio of the bonder or nip rolls relative to the chilled rolls can be varied, and in most cases is between about 2:1 and 8:1 and in some is approximately 4:1 to 6:1.

As an alternative, the elastic strands may be bonded to a polymeric web prior to stretching so that the strands can be handled in a single sheet form. In this process, a tackified meltblown web may be applied onto a set of parallel elastic filaments. The web/strand sheet will be stretched and then fed into a calender nip so as to bond facings to the sheet with the use of an adhesive system. When utilized, this particular process allows for occasional filament breakage or imperfection without interrupting the manufacturing process.

In certain instances, one or more additional facings may be bonded to the other unattached surface of the stretched continuous filaments so as to achieve a stretchable article wherein the continuous filaments are sandwiched between at least two outer facings. Again, the particular bonding mechanism and method is not limited by the teachings of the present invention. In many instances, merely applying a spray adhesive to one surface of one outer facing, and then contacting the adhesive-carrying facing with the stretched continuous filaments and with a second outer facing will result in sufficient bonding strength for a two-facing/continuous filament laminate product.

After bonding of the facing(s) to the continuous filaments to form a spunbond/elastomeric continuous filament/spunbond laminate, the laminate is then allowed to relax and contract to an unstretched or less stretched, condition. The laminate is then wound onto a take-up roll via a surface driven winder. The speed ratio of the winder relative to the bonder rollers results in relaxation of the stretched continuous filaments and a retraction of the laminate into a gathered state as the laminate is wound onto the roll. For example, the winder speed to bonder roll speed may be approximately 0.3 to about 1.0, and may be from about 0.5 to 1.0. The contraction of the continuous filaments results in a gathered, stretchable laminate article where the outer facing(s) is gathered between the bonding points.

The overall basis weight of the laminate can vary, but in some applications is between about 2 and about 4 ounces per square yard ("oz/yd$^2$"). In one particular embodiment, the basis weight is between about 2.85 and about 3.2 oz/yd$^2$.

Various types of compositions and various processing conditions may be utilized to form the elastic continuous filaments. For example, a KRATON™ brand elastic polymer may be fed into an extruder where the polymer is melted at a controlled temperature of between about 260° and 460° F., and in certain instances at about 385° F. In other embodiments, depending on the particular polymer employed, the melt temperature may be approximately 470° F. to 480° F. The addition of a polyorganosiloxane can reduce the extrusion temperature by as much as 50 to 100° F. The polymer is then extruded through a predetermined number of apertures in a die head in a generally downward direction into separate continuous filaments at a pressure of approximately 300 to 4000 psi (typically from about 1500 to about 2000 psi). As explained below, various die hole configurations may be utilized in the present invention.

The facing(s) may be a mixture of elastic and nonelastic fibers or particulates. For example, U.S. Pat. No. 4,209,563 is incorporated herein in its entirety by reference thereto and describes the process by which elastomeric and nonelastomeric fibers are commingled to form a single coherent web of randomly dispersed fibers. Another example of such an elastic composite web is shown in U.S. Pat. No. 4,741,949, which is also incorporated herein in its entirety by reference thereto wherein an elastic nonwoven material is described as including a mixture of meltblown thermoplastic fibers and other materials. The fibers and other materials may be combined in the forming gas stream in which the fibers are borne so that an intimate entangled commingling of fibers and other materials, e.g., wood pulp, staple fibers or particulates such as, for example, activated charcoal, clays, starches, or hydrocolloid (hydrogel) particulates, occurs prior to collection of the fibers upon a collecting device to form a coherent web of randomly dispersed fibers.

Various processing aids may also be added to the elastomeric polymers utilized in the present invention. For example, a polyolefin may be blended with the elastomeric polymer (e.g., the A-B-A elastomeric block copolymer) to improve the processability of the composition. The polyolefin should be one which, when so blended and subjected to an appropriate combination of elevated pressure and elevated temperature conditions, is extrudable in blended form with the elastomeric polymer. Useful blending polyolefin materials include, for example, polyethylene, polypropylene and polybutene, including ethylene copolymers, propylene copolymers and butene copolymers. A particularly useful polyethylene may be obtained from the U.S.I. Chemical Company under the trade designation Petrothene NA 601 (also referred to herein as PE NA 601 or polyethylene NA 601). Another suggested wax includes Elpolene C-10 PE wax from Eastman Chemical of Kingsport, Tenn. Two or more of the polyolefins may be utilized. Extrudable blends of elastomeric polymers and polyolefins are disclosed in, for example, U.S. Pat. No. 4,663,220, which is incorporated herein in its entirety by reference thereto.

The elastomeric materials that are utilized to form the melt-spray adhesive and/or the elastomeric filaments may have sufficient tackiness to either allow or enhance autogenous bonding. For example, the elastomeric polymer itself may be tacky when formed into fibers and/or filaments or, alternatively, a compatible tackifying resin may be added to the extrudable elastomeric compositions described above to provide tackified elastomeric fibers and/or filaments that autogenously bond. Various known tackifying resins and tackified extrudable elastomeric compositions may be employed, such as those described in U.S. Pat. No. 4,789,699, which is incorporated herein in its entirety by reference thereto.

Any tackifier resin can be used that is compatible with the elastomeric polymer and can withstand the extrusion processing conditions. If the elastomeric polymer (e.g., A-B-A elastomeric block copolymer) is blended with processing aids such as, for example, polyolefins or extending oils, the tackifier resin should also be compatible with those processing aids. Generally, hydrogenated hydrocarbon resins exhibit enhanced temperature stability and, thus, may be desirable tackifiers. REGALREZ™ hydrocarbon resins and ARKON™ series tackifiers are examples of hydrogenated hydrocarbon resins. ZONATAK™ 501 lite is an example of a terpene hydrocarbon. REGALREZ™ hydrocarbon resins are available from Eastman Chemical Company of Kingsport, Tenn. ARKON™ series resins are available from Arakawa Chemical (U.S.A.) Incorporated. Of course, the present invention is not limited to use of such tackifying resins, and other tackifying resins that are compatible with the other components of the composition and that can withstand the processing conditions may also be used.

In one embodiment, the blend used to form the elastomeric continuous filaments as well as the facings include, for example, from about 40 to about 80 percent by weight elastomeric polymer, from about 5 to about 40 percent polyolefin, and from about 5 to about 40 percent resin tackifier. For example, a particular composition may include, by weight, about 61 to about 65 percent KRATON™ 1657 (in one instance, about 63 percent), about 17 to about 23 percent polyethylene NA 601-04 wax (in one instance, about 20 percent), and about 15 to about 20 percent REGALREZ™ 1126 (in one instance, about 17 percent). KRATON™ 1657 is, in particular, a styrene-ethyl butylene-styrene (S-EB-S) triblock base rubber polymer.

In another embodiment, a polymer blend consisting of approximately 85% A-B-A'-B' tetrablock base rubber polymer (sold as G1730 by KRATON™ Polymers) and 15% EPOLENE C10 polyethylene wax from Eastman Chemical Company of Kingsport, Tenn. may be employed. In this particular instance, the A and A' in the rubber polymer may be thermoplastic blocks containing a styrene moiety and B and B' may be elastomeric polymer blocks consisting of poly(ethylene-propylene).

In an additional embodiment, another polymer blend consisting of approximately 80% A-B-A'-B' tetrablock base rubber polymer, 7 weight percent of EPOLENE C10 polyethylene wax, and 13 weight percent of REGALREZ™ 1126 tackifier may be used. As above, the A and A' in the rubber polymer may be thermoplastic blocks containing a styrene moiety and B and B' may be elastomeric polymer blocks consisting of poly(ethylene-propylene).

In another embodiment, a polymer blend consisting of approximately 70 weight percent of A-B-A'-B' tetrablock base rubber polymer and 30 weight percent of C10 polyethylene wax may be utilized. As above, the A and A' in the rubber polymer may be thermoplastic blocks containing a styrene moiety and B and B' may be elastomeric polymer blocks consisting of poly(ethylene-propylene).

These various compositions may be utilized to form both the continuous filaments and the spunbond outer facing(s).

In many applications, composite materials of this type are adapted to stretch and recover in only one direction such as, for example, the machine direction whereby continuous filaments are provided in parallel as shown in the attached Figures. Thus, the elastic component of the composite may not be isotropic. That is, the elastic component need not have the same stretch and recovery properties in every direction. Desirably, the elastic component would have the required stretch and recovery properties in only the direction that the gathered inelastic material allows the composite to stretch. For example, if filaments, fibers and/or strands of an elastic material were configured in only one direction, a relatively smaller amount of elastic material could be used to provide certain levels of elastic properties, such as tension, in that one direction than if the elastic material was isotropic. Reducing the amount of elastic material in the composite reduces its cost, making such single use or limited use products such as, for example, disposable personal care products such as diapers, attractive.

Turning now to FIG. 1, an exemplary apparatus is depicted to carry out the above-described process. As shown in FIG. 1, the VFL system 11 is vertically configured. An extruder 15 is mounted for extruding continuous molten filaments 14 downward from a die at a canted angle onto chilled positioning roller 12. Chilled positioning roller 12 ensures proper alignment through the remainder of the system as it spreads the filaments. As the filaments travel over the surface of chilled positioning roller 12, they are cooled and solidified as they travel towards and over the chilled surface of first chilled roller 13. The filaments then travel downward in an "s-shaped" progression to second roller 16 and then across the surface of third roller 17, fourth roller 18 and into the nip formed by nip roller 19 and nip roller 20.

The continuous filaments may be combined at the nip with various types of facings. In the embodiment depicted in FIG. 1, a first non-woven spunbond facing 22 and a second non-woven spunbond facing 24 are combined on opposing surfaces of the continuous filaments to form a bonded laminate 25. In some embodiments, only one facing may be used, and in other embodiments it is possible to combine the elastic continuous filaments with three, four, or more layers of facing material.

Bonding of the facings to the continuous filaments typically occurs by utilizing a spray-type adhesive. A spray head 23 delivers adhesive to the surface of at least one of the non-woven spunbond facings (first spunbond facing 22 in FIG. 1) prior to compression and lamination at the nip. A second spray head which applies adhesive to another non-woven spunbond facing may be employed in some embodiments, especially for those instances for which a relatively large amount of adhesive is needed, or where larger elastic strands are present. In some embodiments, larger amounts of adhesive are needed to anchor the elastic into the non-woven spunbond. A take-up roll 21 as shown in FIG. 1 may be employed for receiving and winding the bonded spunbond/continuous filament/spunbond laminate 25 for storage.

Figure 2:
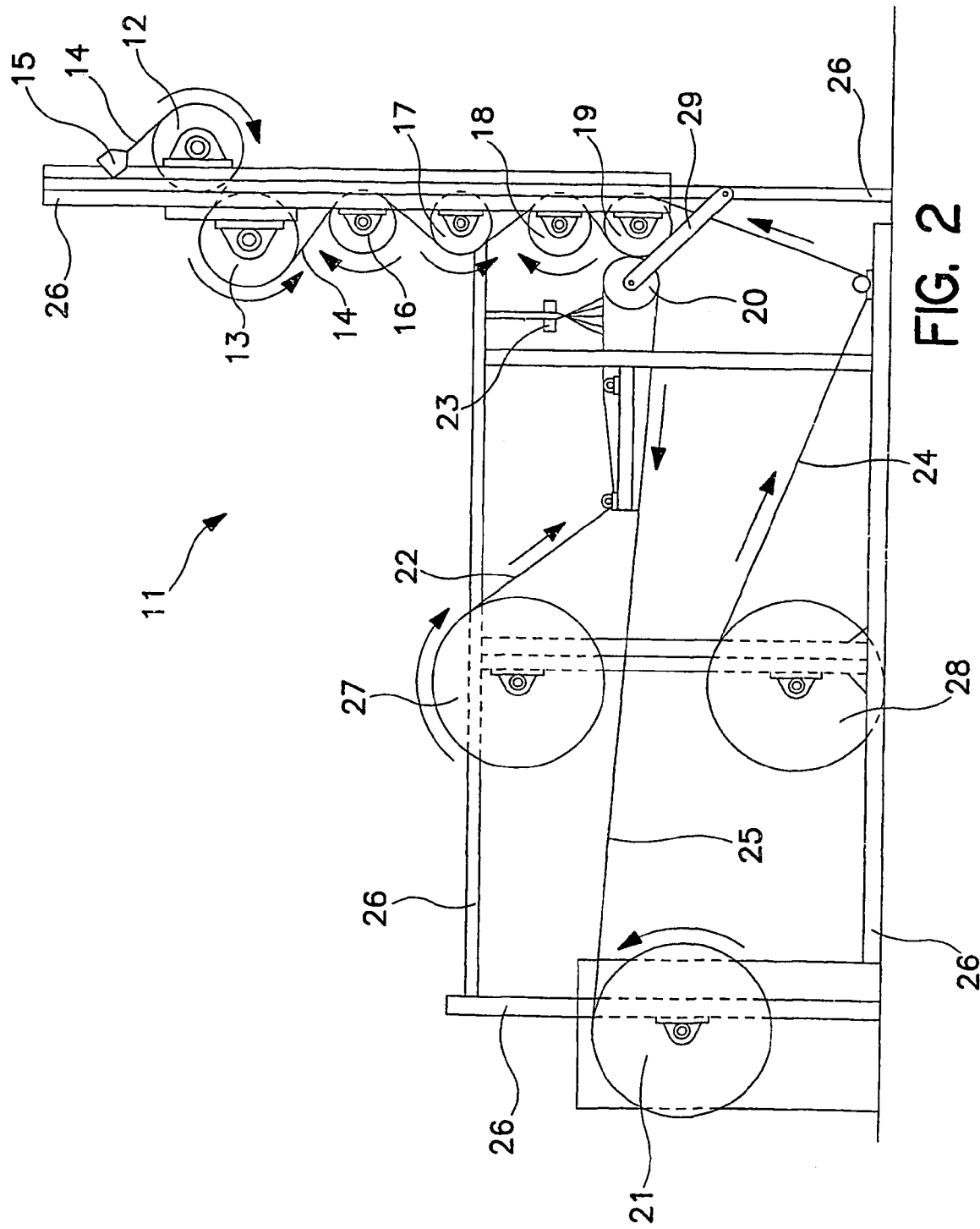
FIG. 2 is a side view of the VFL system of FIG. 1.

FIG. 2 illustrates a side view of the VFL assembly, including support frame 26 upon which the various components of the system are secured. Reference numerals are employed throughout the Figures consistently to indicate the same components in the various views. As shown for the first time in FIG. 2, first outer facing roll 27 and second outer facing roll 28 provide the desired facings 22 and 24 to the assembly. Support strut 29 holds the nip roller 20 in place. The rollers can be seen in side view transferring the continuous filaments downward to the nip, where the filaments combine with the facings to form a bonded laminate.

Figure 3:
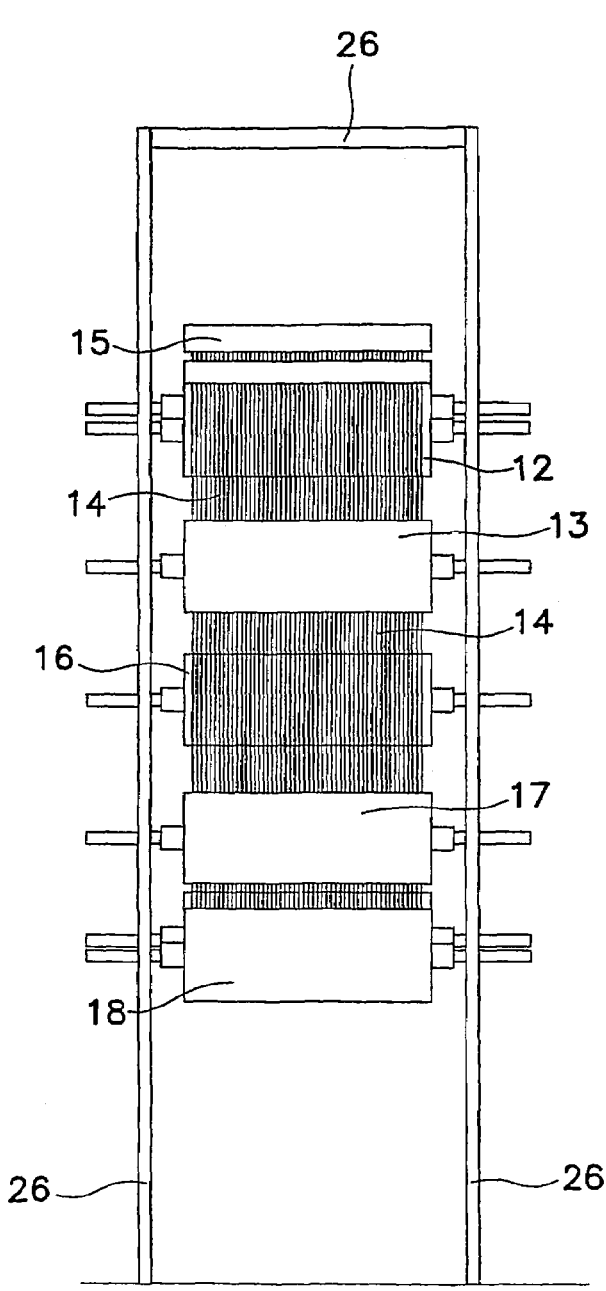
FIG. 3 is an end view of the VFL system viewed from the right hand side of FIG. 2.

In FIG. 3, an end view of the assembly of the embodiment shown in FIG. 1 showing the rollers mounted on support frame 26 is depicted. This particular embodiment employs five rollers, but other embodiments may use less or more rollers, depending upon the nature of the continuous filament elastic composition, the degree of elasticity required in the final product, the number of layers in the product, and the like.

Figure 4:
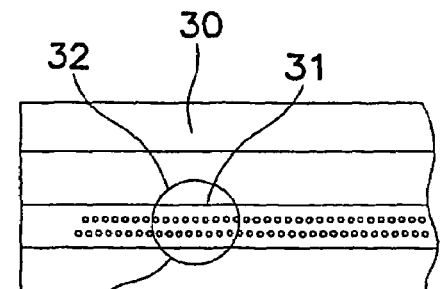
FIG. 4 is a partial view of the extrusion surface of an exemplary extruder head.
Figure 5:
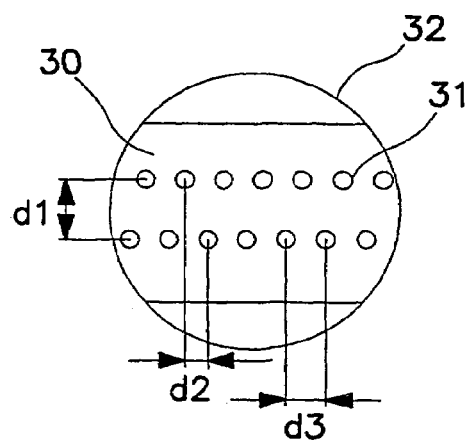
FIG. 5 is a magnified view of a portion of the surface in FIG. 4 illustrating extruder capillary apertures.

FIG. 4 depicts an exemplary extruder die head 30 with capillary holes 31. In FIG. 5, a close-up view 32 of the die head is depicted. The pattern and diameter of the capillary holes on the extruder die head may be varied to provide filaments, with the appropriate spacing, without having to utilize expensive combs, etc., to form a fabric having the correct elastic geometry. The distances d1 (distance between rows of capillary hole centers), d2 (distance between contiguous diagonal capillary hole centers on opposing rows) and d3 (distance between contiguous capillary hole centers in the same row) may be varied, depending on the particular features desired in the final products. For example, various hole densities may be utilized in the present process. In a 12-filament/inch example, the distance between center lines of the die holes (d1) may be approximately 2.12 millimeters. When a hole density of 18-filaments/inch is utilized, the distance between die hole center lines (d1) is approximately 1.41 mm.

Figure 6:
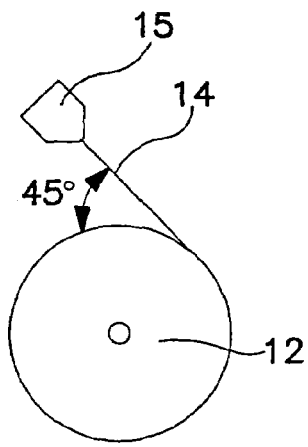
FIG. 6 is a side view depicting an exemplary position of the extruder head in relation to a roller of the present invention.

FIG. 6 illustrates a side view of the extruder 15 in a canted position relative to the vertical axis of roller 12. The 45° angle indicated on the Figure has been found to be one angle that produces an acceptable product and that allows the continuous filaments to mate with roller 12 to allow the rethreading of broken filament as described above.

Maintaining a certain roller speed allows the appropriate degree of elastic stretch to allow the puckers to form in the final laminate. The positioning chilled roller 12 normally turns at a surface speed in the range of about 3-10 feet per minute ("fpm"), while the first vertically-placed chilled roller turns at about 5 to about 15 fpm. The next roller turns at about 7 to about 18 fpm, while the last roller, when applied and used, turns at a speed of about 12 to about 100 fpm. These ranges are approximate, and can vary depending upon the conditions and final product configuration desired.

In one particular process, the first chilled roll may turn at approximately 5 fpm; the second chilled roll at approximately 6 fpm; the third unchilled roll at approximately 11 fpm; and the fourth unchilled roll at approximately 26 fpm. Another process utilizes a first roll speed of 10 fpm; a second roll speed of 20 fpm; a third roll speed of 40 fpm; and a fourth roll speed of 80 fpm. In this process, the speed of the nip rollers is approximately 75 fpm. In a further process, the speed of the first chilled roll may be approximately 400 fpm; the speed of subsequent rolls may be approximately 750 fpm to stretch the continuous filaments; the speed of the composite material being formed at the nip rollers may be approximately 1500 fpm; and the winding roller speed (to allow relaxation and, thus, gathering of the spunbond facings) may be approximately 700 fpm.

In addition, in many laminates, the adhesive component is applied to the surface of the nonwoven layer in discreet adhesive lines. The adhesive may be applied in various patterns so that the adhesive lines intersect the elastic filament lines to form various types of bonding networks which could include either adhesive-to-elastic bonds or both adhesive-to-elastic bonds and adhesive-to-adhesive bonds. These bonding networks may include a relatively large total number of adhesive-to-elastic and adhesive-to-adhesive bonds that provide the laminated article with increased strength, while utilizing minimal amounts of adhesive. Such enhancements are achieved by the use of lay-down or spray patterns of adhesive formed by spraying adhesive onto the surface of the nonwoven in a predetermined and specific pattern. In most cases, a final product with less adhesive exhibits a reduction in undesirable stiffness, and is generally more flexible and soft than products having more adhesive.

Applying the adhesive in a pattern so that the adhesive lines are perpendicular or nearly perpendicular to the elastic components has been found particularly advantageous. A true 90° bond angle may not be possible in practice, but an average or mean bond angle that is as great as 50° or 60° will generally produce a suitable bond between the elastic strands and the facing material. A conceptual illustration of these types of bond angles is illustrated in FIGS. 12D and 14 of U.S. Patent Application Publication no. US 2002/0104608. The adhesive-to-elastic bonds are formed where the lines of adhesive and elastic strands join or intersect.

The continuous adhesive filaments-to-elastic strand intersections are also controlled to a predetermined number of intersections per unit of elastic strand length. By having such adhesive lines in a perpendicular orientation and optimizing the number of bonds per unit of elastic strand length, the final elastic strand laminate can be produced with a minimal amount of adhesive and elastomeric strand material to provide desirable product characteristics at a lower cost.

Various bonding techniques may be useful in the present invention. For example, adhesive may be applied in a prescribed line instead of the aforementioned melt-spray. An exemplary adhesive line scrim pattern useful in the present invention is illustrated in FIG. 13A of U.S. Patent Application Publication no. US 2002/0104608. As used herein, a "scrim" refers generally to a fabric or nonwoven web of material which may be elastic or inelastic, and having a machine direction ("MD") oriented strand component along the path of product flow during manufacture and a cross-machine direction ("CD") strand component across the width of the fabric. The adhesive line pattern can be applied to the laminate with attenuation of the adhesive lines in the cross-machine direction. The scrim pattern illustrated in FIG. 13 includes adhesive lines 136 and elastic filaments 130. FIG. 13B illustrates another exemplary scrim pattern 138 having adhesive lines 139 applied to elastic strands 130. In this embodiment, it can be seen that the bond angle is very high, approaching 90° at the intersection between the adhesive and the elastic filaments. FIG. 13C illustrates another scrim pattern 141 having adhesive lines 142 and continuous elastic strands 130.

Control of the cross deckle, or cross-machine direction, basis weight variation may be caused by stretching the elastic strands prior to lamination of the outer facings. In certain prior processes, the basis weight of the elastic strands may various across the width of the web because the filaments tend to migrate to the edges as they are stretched due to the poisson effect. In such cases, a material, when stretched in the x direction, tends to contract in the y and z directions.

The present process, in certain embodiments, may prevent such migration by correlating the necking profile of the stretched strands and the strand basis weight profile. A desired shift in the cross deckle basis weight can be determined and then adjustments may be made to the extruder die to match the desired shift. In particular, the lengths of the die capillaries can be adjusted so as to control individual filament diameters. Longer capillary holes on the edges of the die will yield thinner filaments with a reduced basis weight. As the strands are subsequently stretched and the middle filaments migrate, the as-produced uneven basis weight profile will shift into a relatively even cross-deckle basis weight profile. Such uniformity allows for more consistent roll building and converting of outside slits of material.

The following die plate illustrated in FIG. 9 of U.S. Patent Application Publication no. US 2002/0104608 can be utilized. One particular die that may be utilized in the present VFL, when desired, has 6:1 length to distance ("L/D") capillaries in the center of the die that gradually lengthen to 8:1 L/D capillaries at the edges. FIG. 9 of U.S. Patent Application Publication no. US 2002/0104608 illustrates a representative die with such a profile design.

The present invention may be better understood by reference to the Examples below in which comparisons exemplary elastomeric compositions of the present invention are provided.

EXAMPLES

Control Example A

Control Example A was formed by melt extruding an elastomeric composition to form 12 gram per square meter (gsm) filaments at 12 holes per inch between two 0.4 ounce per square yard (osy) spunbond fabric layers that had been thermally point bonded with a wire weave pattern. The diameter of the holes was 0.9 millimeters. The elastomeric composition consisted of about 80 weight percent of KRATON™ G1730 elastomer obtained from KRATON™ Polymers of Houston, Tex.; about 13 weight percent of REGAL-REZ™ 1126 tackifier obtained from Eastman Chemical Company and about 7 weight percent of EPOLENE C10 polyethylene wax obtained from Eastman Chemical Company. The elastomeric composition was extruded into elastic filaments that stretched at about 300 percent and introduced between the two point bonded spunbond layers at a nip to form a vertical filament laminate (VFL). The laminate was then allowed to relax a total of about 10 percent by setting the nip speed to about 90 percent of the line speed. The melt temperature was 425° F.

At a throughput of 1 rpm, the melt pressure was 46 psi and the filaments were produced having smooth surfaces without shark skinning. No melt fracture was observed. At a throughput of 3 rpm, the melt pressure was 970 psi and the filaments produced had slightly fractured surfaces but were otherwise clear. At a throughput of 6 rpm, the melt pressure was 1,621 psi and the filaments had melt fractured surfaces. At a throughput of 9 rpm, the melt pressure was 2,080 psi and the filaments produced had severe melt fracture.

The laminate of Control Example A was tested for peel strength after two weeks of aging at ambient conditions, about ° F. (C°) and percent relative humidity. The peel strength of the laminate of Control Example A was 175 grams with a standard deviation of 6. The laminate of Control Example A was extruded at a rate of 9 revolutions per minute (rpm).

Example 1

Example 1 was formed similar to Control Example A above except that 250 parts per million of SILQUEST® PA-1 polyorganosiloxane processing aid was included in the elastomeric KRATON™ G2838 composition used to form the filaments of this Example 1. The melt temperature was about 425° F. The SILQUEST® PA-1 polyorganosiloxane processing aid was included in the elastomeric resin as a concentrate by adding 2.5% of a concentrate consisting of 1 weight percent of SILQUEST® PA-1 polyorganosiloxane and 99 weight percent of KRATON™ G2838 elastomer.

At a throughput of 3 rpm, the melt pressure was 750 psi and filament were produced having smooth surfaces without shark skinning. No melt fracture was observed. At a throughput of 6 rpm, the melt pressure was 1,260 psi and the filaments produced had slightly fractured surfaces but were otherwise clear. At a throughput of 9 rpm, the melt pressure was 1,700 and the filaments had melt fractured surfaces. And, at a throughput of 12 rpm, the melt pressure was 2,040 psi and the filaments produced had severe melt fracture.

The peel strength of the laminate of Example 1 was 129 grams with a standard deviation of 7.

Example 2

Example 2 was formed similar to Control Example A except that 500 parts per million of SILQUEST® PA-1 polyorganosiloxane processing aid was included in the elastic composition used to form the filaments of this Example 2. The melt temperature was about 425° F.

At a throughput of 3 rpm, the melt pressure was 800 psi and filament were produced having smooth surfaces without shark skinning. No melt fracture was observed. At a throughput of 6 rpm, the melt pressure was 1,300 psi and the filaments produced had slightly fractured surfaces but were otherwise clear. At a throughput of 12 rpm, the melt pressure was 2,140 and the filaments had melt fractured surfaces.

The peel strength of the laminate of Example 2 was 138 grams with a standard deviation of 12.

Example 3

Example 3 was formed similar to Control Example A except that 1000 parts per million of SILQUEST® PA-1 polyorganosiloxane processing aid was included in the elastic composition used to form the filaments of this Example 3. The melt temperature was about 425° F.

At a throughput of 6 rpm, the melt pressure was 1,285 psi and filaments were produced having smooth surfaces without shark skinning. No melt fracture was observed. At a throughput of 9 rpm, the melt pressure was 1,740 psi and the filaments had melt fractured surfaces. At a throughput of 12 rpm, the melt pressure was 2,100 and the filaments produced had severe melt fracture.

The peel strength of the laminate of Example 3 was 103 grams with a standard deviation of 6.

Control Example B

Control Example B was formed by melt extruding an elastomeric composition to form 12 gram per square meter (gsm) filaments between two 0.4 ounce per square yard (osy) spunbond fabric layers that had been thermally point bonded with a wire weave pattern. The elastomeric composition consisted of about 80 weight percent of KRATON™ MD6665 elastomer, about 13 weight percent of REGAL-REZ™ 1126 tackifier and about 7 weight percent of EPOLENE C10 polyethylene wax. The elastomeric composition was extruded into filaments that were stretched at about 300 percent and introduced between the two point bonded spunbond layers at a nip and then allowed to relax a total of about 10 percent of the nip speed. The melt temperature was about 460° F.

At a throughput of 1 rpm, the melt pressure was 600 psi and filaments were produced having smooth surfaces without shark skinning. No melt fracture was observed. At a throughput of 3 rpm, the melt pressure was 1,247 psi and the filaments had melt fractured surfaces. At a throughput of 6 rpm, the melt pressure was 2,100 and the filaments produced had severe melt fracture.

The peel strength of the laminate of Control Example B was 224 grams with a standard deviation of 50.

Example 4

Example 4 was formed similar to Control Example B above except that 250 parts per million of SILQUEST® PA-1 polyorganosiloxane processing aid was included in the KRATON™ MD6665 elastomeric composition used to form the filaments of this Example 4. The melt temperature was about 460° F.

At a throughput of 3 rpm, the melt pressure was 1,180 psi and filaments were produced having smooth surfaces without shark skinning. No melt fracture was observed. At a throughput of 6 rpm, the melt pressure was 1,870 psi and the filaments produced had slightly fractured surfaces but were otherwise clear. At a throughput of 9 rpm, the melt pressure was 2,400 psi and the filaments had severe melt fractured surfaces.

The peel strength of the laminate of Example 4 was 234 grams with a standard deviation of 100. The reduction in peel strength observed in Example 4 by adding 250 ppm of SILQUEST® PA-1 polyorganosiloxane processing aid to the KRATON™ MD6665 elastomeric composition was negligible compared to the Control Example B that did not include any processing aid.

Example 5

Example 5 was formed similar to Control Example B except that 500 parts per million of SILQUEST® PA-1 polyorganosiloxane processing aid was included in the KRATON™ MD6665 elastic composition used to form the filaments of this Example 5. The melt temperature was 460° F.

At a throughput of 3 rpm, the melt pressure was 1,100 psi and filaments were produced having smooth surfaces without shark skinning. No melt fracture was observed. At a throughput of 6 rpm, the melt pressure was 1,800 psi and filaments were produced having smooth surfaces without shark skinning. No melt fracture was observed. At a throughput of 9 rpm, the melt pressure was 2,450 psi and the filaments had melt fractured surfaces.

The peel strength of the laminate of Example 5 was 162 grams with a standard deviation of 21. The reduction in peel strength observed in Example 5 by adding 500 ppm of SILQUEST® PA-1 polyorganosiloxane processing aid to the KRATON™ MD6665 elastomeric composition was about 35 percent less than Control Example B and is considered acceptable. Generally, peel strengths comparable to control grams are acceptable.

Example 6

Example 6 was formed similar to Control Example B except that 1000 ppm of SILQUEST® PA-1 polyorganosiloxane processing aid was included in the KRATON™ MD6665 elastic composition used to form the filaments of this Example 6. The melt temperature was 460° F.

At a throughput of 1 rpm, the melt pressure was 590 psi and filaments were produced having smooth surfaces without shark skinning. No melt fracture was observed. At a throughput of 3 rpm, the melt pressure was 1,250 psi and filaments were produced having smooth surfaces without shark skinning. No melt fracture was observed. At a throughput of 6 rpm, the melt pressure was 2,000 psi and the filaments had melt fractured surfaces.

The peel strength of the laminate of Example 6 was 164 grams with a standard deviation of 18. Likewise, the reduction in peel strength observed in Example 6 by adding 500 ppm of SILQUEST® PA-1 polyorganosiloxane processing aid to the KRATON™ MD6665 elastomeric composition was about 35 percent less than Control Example B and is considered acceptable.

Example 7

Example 7 was formed similar to Control Example B except that 500 ppm of SILQUEST® PA-1 polyorganosiloxane processing aid and 2,000 ppm of Ken® CAPS L01/L titanate were included in the KRATON™ MD6665 elastic composition used to form the filaments of this Example 7. The melt temperature was 460° F.

At a throughput of 3 rpm, the melt pressure was 1,400 psi and the filaments produced had slightly fractured surfaces but were otherwise clear. At a throughput of 6 rpm, the melt pressure was 2,170 psi and the filaments had severe melt fractured surfaces.

Example 8

Example 8 was formed similar to Control Example B except that 500 ppm of SILQUEST® PA-1 polyorganosiloxane processing aid and 2,000 ppm of Ken® CAPS L01/L titanate were included in the KRATON™ MD6665 elastic composition used to form the filaments of this Example and the melt temperature was increased to 480° F.

At a throughput of 3 rpm, the melt pressure was 950 psi and the filaments produced had slightly fractured surfaces but were otherwise clear. At a throughput of 7 rpm, the melt pressure was 1,760 psi and the filaments had severe melt fractured surfaces. And, at a throughput of 9 rpm, the melt pressure was 2,080 psi and the filaments had severe melt fractured surfaces.

It was observed that SILQUEST® PA-1 polyorganosiloxane processing aid can be added to KRATON™ elastomeric compositions to improve processing conditions while still maintaining acceptable mechanical properties, namely peel strength of VFL laminates formed with elastomeric filaments. Throughput limitations on pressure and melt fracture during extrusion of KRATON™ elastomeric resins are significantly reduced with the addition of SILQUEST® PA-1 polyorganosiloxane processing aid and faster production rates and lower operating temperatures, for example by as much as 50-100° F., are possible. Advantageously, the addition of SILQUEST® PA-1 polyorganosiloxane processing aid to KRATON™ elastomeric compositions improves processing may provide one or more of the following benefits: reduce shear, delay the on set of melt fracture as throughputs are increased, reduce die lip fouling, reduce spinneret plugging, reduce or eliminate drool upset during production, and generally increase the processing window of a particular elastomeric resin and apparatus, for example by lowering extrusion pressures and/or temperatures. These benefits may also extend die and pack life. Furthermore, the addition of SILQUEST® PA-1 polyorganosiloxane processing aid can enable the use of less adhesive. Additionally, reduced melt fracture during filament extrusion increased the stability of the extruded elastomeric filaments out of the die and minimized overlapping of the filaments and doglegging of the filaments improving processing of the filaments and laminates including such elastomeric filaments.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

We claim:

1. A melt extrudable composition comprising:
one or more elastomeric styrenic block copolymers, wherein the styrenic block copolymers include styrene-ethylene/propylene-styrene, styrene-ethylene/butylene-styrene, styrene-ethylene/propylene-styrene-ethylene/propylene, styrene-ethylene/butylene-styrene-ethylene/butylene, or combinations thereof, wherein the elastomeric polymers constitute about 50 wt. % or more of the composition; and
one or more polyorganosiloxanes having the following formula:

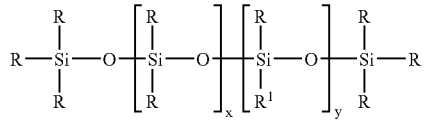

wherein,
R is an alkyl radical;
$R^1$ is a monovalent organic radical comprising an ethylene oxide group, vicinal epoxy group, or amino group; and
x and y are independently selected from the group consisting of positive integers.

2. The melt extrudable composition of claim 1, wherein the styrenic copolymers are selected from the group consisting of styrene-ethylene/propylene-styrene block copolymers, styrene-ethylene/butylene-styrene block copolymers, and combinations thereof.

3. The melt extrudable composition of claim 1, wherein the styrenic copolymers are selected from the group consisting of styrene-ethylene/propylene-styrene-ethylene/propylene block copolymers, styrene-ethylene/butylene-styrene-ethylene/butylene block copolymers, and combinations thereof.

4. The melt extrudable composition of claim 1, wherein the polyorganosiloxanes comprise from about 0.01 to about 0.5 wt. % of the composition.

5. The melt extrudable composition of claim 1, wherein the polyorganosiloxanes comprise from about 0.01 to about 0.2 wt. % of the composition.

6. The melt extrudable composition of claim 1, wherein the polyorganosiloxanes comprise from about 0.01 to about 0.1 wt. % of the composition.

7. The melt extrudable composition of claim 1, wherein the elastomeric polymers comprise greater than about 75 wt. % of the composition.

8. The melt extrudable composition of claim 1, wherein the extrusion temperature of the composition is less than the extrusion temperature that would otherwise be required without the polyorganosiloxanes.

9. The melt extrudable composition of claim 1, where the composition further comprises one or more titanates, zirconates, or a mixture thereof.

10. The melt extrudable composition of claim 1, wherein the composition comprises one or more titanates, zirconates, or a mixture thereof, in an amount from about 0.01 to about 3 wt. %.

11. The melt extrudable composition of claim 1, further comprising one or more polyolefins.

12. Continuous filaments comprising the melt extrudable composition of claim 1.

13. A laminate comprising the continuous filaments of claim 12 and a nonwoven web.

14. The laminate of claim 13, wherein the nonwoven web is a spunbond web.

15. A method for forming a melt extrudate, the method comprising extruding a composition through a die of an extruder, the composition comprising one or more elastomeric styrenic block copolymers, wherein the styrenic block copolymers include styrene-ethylene/propylene-styrene, styrene-ethylene/butylene-styrene, styrene-ethylene/propylene-styrene-ethylene/propylene, styrene-ethylene/butylene-styrene-ethylene/butylene, or combinations thereof, wherein the elastomeric polymers constitute about 50 wt. % or more of the composition, the composition further comprising one or more polyorganosiloxanes having the following formula:

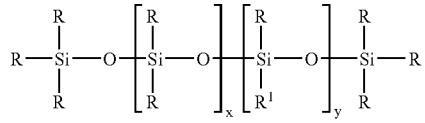

wherein,
R is an alkyl radical;
$R^1$ is a monovalent organic radical comprising an ethylene oxide group, vicinal epoxy group, or amino group; and
x and y are independently selected from the group consisting of positive integers.

16. The method of claim 15, wherein one or more of the elastomeric polymers has a styrenic endblock.

17. The method of claim 15, wherein the styrenic triblock copolymers are selected from the group consisting of styrene-ethylene/propylene-styrene block copolymers, styrene-ethylene/butylene-styrene block copolymers, and combinations thereof.

18. The method of claim 15, wherein the styrenic copolymers are selected from the group consisting of styrene-ethylene/propylene-styrene-ethylene/propylene block copolymers, styrene-ethylene/butylene-styrene-ethylene/butylene block copolymers, and combinations thereof.

19. The method of claim 15, wherein the polyorganosiloxanes comprise from about 0.01 to about 0.5 wt. % of the composition.

20. The method of claim 15, wherein extrusion occurs at a temperature that is less than the extrusion temperature that would otherwise be required without the polyorganosiloxanes.

21. The method of claim 15, where the composition further comprises one or more titanates, zirconates, or a mixture thereof.

22. The method of claim 15, wherein the composition is extruded from the die onto a roller positioned at a canted angle relative to the die.

23. The method of claim 15, wherein the extruded composition is stretched using a series of vertically disposed rollers.

24. The method of claim 15, wherein the composition is extruded at a temperature of from about 260° F. to about 460° F.

25. The method of claim 15, wherein the extruded composition is in the form of continuous filaments.

26. The method of claim 25, further comprising laminating the continuous filaments to one or more sheet materials.

27. The method of claim 26, wherein the sheet materials are nonwoven webs.

28. The method of claim 27, wherein the continuous filaments are laminated to one or more spunbond webs.

* * * * *

UNITED STATES PATENT AND TRADEMARK OFFICE
CERTIFICATE OF CORRECTION

PATENT NO. : 7,326,751 B2 Page 1 of 1
APPLICATION NO. : 10/724654
DATED : February 5, 2008
INVENTOR(S) : Mary Lucille DeLucia et al.

It is certified that error appears in the above-identified patent and that said Letters Patent is hereby corrected as shown below:

Claim 17, line 1, delete "triblock"

Signed and Sealed this

Third Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 7,326,751 B2  Page 1 of 1
APPLICATION NO. : 10/724654
DATED : February 5, 2008
INVENTOR(S) : Mary Lucille DeLucia et al.

It is certified that error appears in the above-identified patent and that said Letters Patent is hereby corrected as shown below:

Column 20

Claim 17, line 51, delete "triblock"

This certificate supersedes the Certificate of Correction issued June 3, 2008.

Signed and Sealed this

First Day of July, 2008

JON W. DUDAS
*Director of the United States Patent and Trademark Office*